United States Patent
Morris et al.

(10) Patent No.: US 10,830,039 B2
(45) Date of Patent: Nov. 10, 2020

(54) DOWNHOLE TRI-AXIAL INDUCTION ELECTROMAGNETIC TOOL

(71) Applicant: Baker Hughes Incorporated, Houston, TX (US)

(72) Inventors: Steven A. Morris, Spring, TX (US); Jonathan F. Hook, Houston, TX (US); Stanislav W. Forgang, Houston, TX (US); Sushant M. Dutta, Houston, TX (US); Arcady Reiderman, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 1130 days.

(21) Appl. No.: 14/244,473

(22) Filed: Apr. 3, 2014

(65) Prior Publication Data

US 2015/0285068 A1 Oct. 8, 2015

(51) Int. Cl.
*E21B 49/00* (2006.01)
*G01V 3/28* (2006.01)
*G01V 3/20* (2006.01)

(52) U.S. Cl.
CPC ............... *E21B 49/00* (2013.01); *G01V 3/20* (2013.01); *G01V 3/28* (2013.01)

(58) Field of Classification Search
CPC .................................. G01V 3/28; G01R 33/12
See application file for complete search history.

(56) References Cited

U.S. PATENT DOCUMENTS

| 4,812,812 A | 3/1989 | Flowerdew et al. |
| 5,955,884 A | 9/1999 | Payton et al. |

(Continued)

FOREIGN PATENT DOCUMENTS

GB  2287324 A  9/1995

OTHER PUBLICATIONS

Rosthal, Richard et al., "Field Test Results of an Experimental Fully-Triaxial Induction Tool," SPWLA 44th Annual Logging Symposium, 14 pp., (Jun. 22-25, 2003).

(Continued)

*Primary Examiner* — Douglas X Rodriguez
*Assistant Examiner* — Adam S Clarke
(74) *Attorney, Agent, or Firm* — Mossman Kumar & Tyler PC

(57) ABSTRACT

Apparatus and methods for estimating a value of a resistivity property of an earth formation intersected by a borehole. Apparatus may include a carrier conveyable in the borehole; a tri-axial induction antenna assembly along the carrier; and a magnetically transparent sleeve enclosing the antenna assembly. The antenna assembly includes panels circumferentially arrayed about a portion of the carrier to form at least three collocated antennas. Each panel includes a magnetic core, an axially sensing coil that is transversely wound about the magnetic core, and a laterally sensing coil that is longitudinally wound about the magnetic core. The axially sensing coil of each panel may be electrically connected to the axially sensing coils of the other panels to form an axial antenna. Corresponding lateral coils may be electrically connected to form a lateral antenna. Each panel may be individually removable from the carrier, and assembled together may form a cylinder.

18 Claims, 8 Drawing Sheets

(56) References Cited

U.S. PATENT DOCUMENTS

| | | |
|---|---|---|
| 6,366,086 B1 | 4/2002 | Sen |
| 6,930,652 B2 | 8/2005 | Smith et al. |
| 7,038,457 B2 | 5/2006 | Chen et al. |
| 7,286,091 B2 | 10/2007 | Chen et al. |
| 7,612,565 B2 | 11/2009 | Seydoux et al. |
| 8,368,403 B2 | 2/2013 | Homan et al. |
| 8,471,562 B2 | 6/2013 | Knizhnik |
| 2004/0196047 A1* | 10/2004 | Fanini ............ G01V 3/28 324/339 |
| 2005/0167100 A1 | 8/2005 | Itskovich |
| 2005/0189945 A1 | 9/2005 | Reiderman |
| 2005/0189947 A1* | 9/2005 | Haugland ............ G01V 3/30 324/338 |
| 2006/0202699 A1 | 9/2006 | Reiderman |
| 2007/0115000 A1* | 5/2007 | Merchant ............ G01V 3/28 324/330 |
| 2007/0256832 A1 | 11/2007 | Hagiwara et al. |
| 2008/0224707 A1 | 9/2008 | Wisler et al. |
| 2009/0302847 A1 | 12/2009 | Knizhnik |
| 2010/0082255 A1* | 4/2010 | Davydycheva ......... G01V 3/28 702/7 |
| 2010/0225323 A1 | 9/2010 | Tabarovsky et al. |
| 2011/0006764 A1 | 1/2011 | Pearce et al. |
| 2013/0085675 A1 | 4/2013 | Prakash et al. |
| 2013/0141104 A1* | 6/2013 | Homan ............... E21B 47/102 324/339 |
| 2013/0191028 A1* | 7/2013 | Homan ................. G01V 3/28 702/7 |
| 2014/0368197 A1* | 12/2014 | Wang ............... G06F 16/24554 324/333 |

OTHER PUBLICATIONS

World Oil, "What's new in Well Logging," 8 pp., Retrieved on Aug. 23, 2013 from http://www.worldoil.com/June_2013_Whats_new_in_well_logging_and_formation_evaluation.html (Jun. 2013).

ESG Solutions, "Omni-Directional Uniaxial/Triaxial Geophone," 2 pp., Retrieved on Aug. 23, 2013 from https://www.esgsolutions.com/CMFiles/Products/Geophones/G1-1.1-1.0%20G3-1.1-2.0%20v2.pdf (Aug. 2013).

Int'l Search Report and Written Opinion in PCT/US2015/023088, dated Jul. 7, 2015.

EPO Application No. 15773456.7 Search Report dated Sep. 20, 2017.

* cited by examiner

DOWNHOLE TRI-AXIAL INDUCTION ELECTROMAGNETIC TOOL

FIELD OF THE DISCLOSURE

In one aspect, the present disclosure generally relates methods, systems, and devices for earth formation evaluation including determining properties of the earth formation. More specifically, the present disclosure relates to measurements using transient electromagnetic signals.

BACKGROUND OF THE DISCLOSURE

Geologic formations are used for many purposes such as hydrocarbon and water production. Boreholes are typically drilled into the earth in order to intersect and access the formations.

Electromagnetic induction resistivity instruments can be used to determine the electrical conductivity of earth formations surrounding a wellbore. These instruments may be outfitted with antennas that are operable as both transmitters and receivers. Transmitter antennas and receiver antennas may have the same characteristics, and an antenna (e.g., coil) may be used as a transmitter at one time and as a receiver at another.

In transient electromagnetic (TEM) methods, a transmitter is configured to initiate a rapid change in a magnetic dipole, which initiates currents in surrounding earth formations. The transmitter and receiver may be at the surface or within the wellbore. Induced electric eddy currents diffuse outwards from the proximity of the transmitter into the surrounding formation. At different times related to the excitation transient, information arrives at the measurement sensor (e.g., an induction antenna) predominantly from different investigation depths. Generally, early-time signals predominantly relate to near-zone responses (lesser depths of investigation) and late-time signals predominantly relate to remote-zone responses (greater depths of investigation).

SUMMARY OF THE DISCLOSURE

Aspects of the present disclosure generally relate to methods, systems, and devices for evaluating an earth formation using electromagnetic induction logging, including evaluation using transient electromagnetic (TEM) signals. Embodiments according to the present disclosure may include an apparatus for evaluating an earth formation. Apparatus embodiments may include a carrier conveyable in the borehole; a tri-axial induction antenna assembly along the carrier and a magnetically transparent sleeve enclosing the antenna assembly. The tri-axial induction antenna assembly may include panels circumferentially arrayed about a portion of the carrier to form at least three collocated antennas, with each panel including: a magnetic core, an axially sensing coil that is transversely wound about the magnetic core; and a laterally sensing coil that is longitudinally wound about the magnetic core. Three of the at least three collocated antennas may be orthogonal with respect to one another. The at least three collocated antennas may include an axial antenna aligned with a longitudinal axis of the borehole, a first transverse antenna perpendicular to the axial antenna, and a second transverse antenna perpendicular to the first antenna and the second antenna.

The axially sensing coil of each panel may be electrically connected to the axially sensing coils of the other panels to form an axial antenna. The panels may be arranged in four quadrants including at least one of i) a first quadrant disposed on an opposite side of the carrier from a third quadrant, and ii) a second quadrant disposed on another opposite side of the carrier from a fourth quadrant. The corresponding lateral coils may be electrically connected for at least one of i) each of the first quadrant and the third quadrant, and ii) each of the second quadrant and the fourth quadrant, wherein the connected corresponding lateral coils form a lateral antenna. The quadrants substantially form a cylinder. Each induction antenna of the tri-axial antenna assembly may be configured to operate in a critically damped mode when conducting at least one of i) receiving a signal with frequencies over a broadband range, and ii) transmitting a signal with frequencies over a broadband range. The broadband range may extend to greater than 200 kHz. The apparatus may include a conductive underlayer surrounding the portion of the carrier and separating the portion and the tri-axial antenna assembly. The panels may be substantially longitudinally aligned. Each panel may be individually removable from the carrier. At least one of the panels may include an electrostatic shield layer separating the corresponding axial coil and the corresponding lateral coil. The electrostatic shield may comprise at least one of: i) a passive shield, ii) a passive unbalanced shield, iii) a passive balanced shield, and iv) an actively driven shield. Each panel may include an overmold surrounding the magnetic core, the axially sensing coil and the laterally sensing coil configured to maintain alignment of the magnetic core, the axially sensing coil and the laterally sensing coil assembly with respect to the downhole instrument during operation of the tri-axial antenna under pressure compensation while logging.

The apparatus may include a processor configured to estimate the value of the resistivity property of the earth formation using signals from the tri-axial antenna assembly, and may be configured to estimate the value of the resistivity property using transient electromagnetic (TEM) signals received by the tri-axial antenna assembly.

Method embodiments may include inducing a current in the formation; measuring a transient electromagnetic (TEM) signal induced by the formation responsive to the current using a tri-axial induction antenna assembly on a carrier in the borehole, the tri-axial induction antenna assembly comprising panels circumferentially arrayed about a portion of the carrier to form three collocated antennas, with each panel including a magnetic core, an axially sensing coil that is transversely wound about the magnetic core, and a laterally sensing coil that is longitudinally wound about the magnetic core; and estimating a parameter of interest using the signal.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
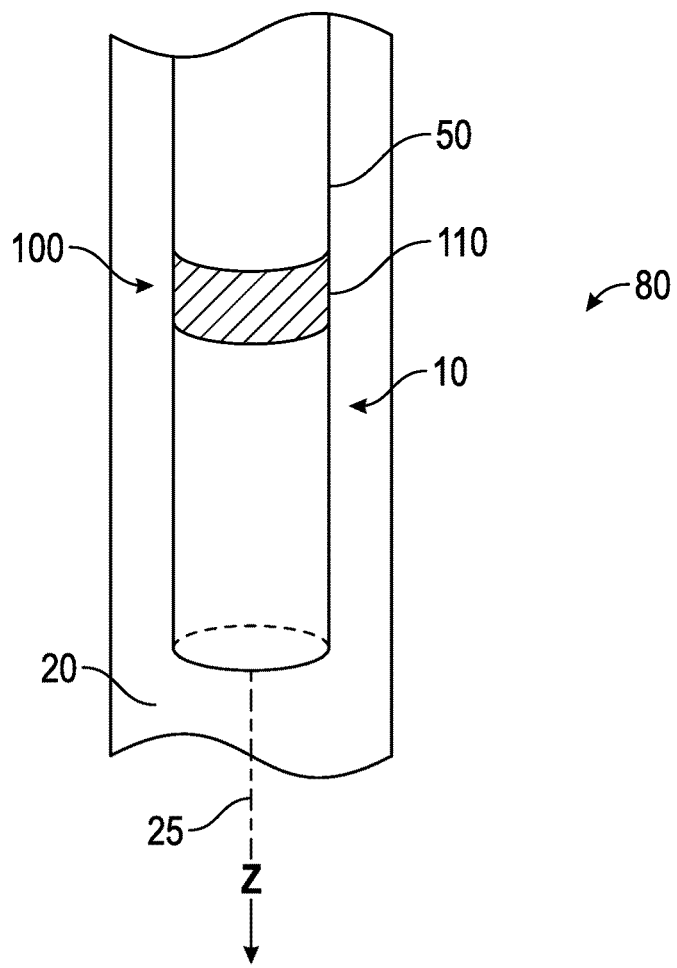
FIGS. 1A-1B show a TEM tool in accordance with embodiments of the present disclosure.

Aspects of the present disclosure relate to apparatuses and methods for electromagnetic induction well logging for evaluating an earth formation. More specifically, the present disclosure relates to a broadband induction sensor, which may be capable of sensing transient electromagnetic (TEM) signals and/or wideband frequency domain signals. The formation may be intersected by a wellbore and the TEM measurements may be taken in the wellbore. The TEM measurements may be used to estimate a parameter of interest.

The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Transient electromagnetic (TEM) tools are configured to effect non-harmonic (e.g., stepwise) changes in a transmitter to induce transient currents—that is, transient short-term currents in the formation, such currents diffusing outward from the borehole to intersect formations of interest. Transient signals occur in the receiver antennas, which are induced by the outwardly diffusing eddy currents in the formation. The induced signals contain information about formation characteristics. Thus, the receiver produces a response indicative of formation characteristics, such as, for example, a parameter of interest such as formation resistivity or location of formation bed boundaries. Electronics may be configured to measure the transient electromagnetic (TEM) signals induced in the receiver antenna (transient receiver signals) in response to magnetic fields induced by the eddy currents in the formation.

It is known in the art to use several component antennas for transmitting, receiving, or both, so that separate magnetic field components may be estimated, such as, for example, main components Hxx, Hzz, and Hyy, and cross components Hxy and Hxz. Conventionally, in Cartesian coordinates the double indexes of magnetic field components contain information of the directions in which transmitter excited the formation and the receiver responds to. Also conventionally, z-direction is the direction aligned with or parallel to the tool longitudinal axis. That is, for instance, component Hzz stands for the value of magnetic field strength in the z-oriented receiver while responding to the excitation made by z-oriented transmitter. Typically, several component antennas are spaced apart from each other along the axis of the tool. Each of these component antennas is configured to receive a specific component of the signal. For example, an axially aligned antenna may detect the z component, and two other orthogonally aligned antennas may detect the x component and y component, respectively. However, the spacing between these antennas causes them to respond to different volumes of the formation, which introduces result interpretation difficulties and error into resistivity measurements. Further, using axially separated sensors would increase the minimum tool length required. Thus, it is desirable to have a collocated tri-axial sensor. However, design considerations for such a sensor may be daunting, as spatial limitations are particularly challenging in measurement-while-drilling ('MWD') and logging-while-drilling ('LWD') applications.

General embodiments of the present disclosure include tools for estimating a value of a resistivity property of an earth formation intersected by a borehole. An example tool may include a carrier conveyable in the borehole and a tri-axial induction antenna assembly along the carrier. The tri-axial induction antenna assembly may include panels circumferentially arrayed about a portion of the carrier and configured to form three collocated antennas for sensing a changing magnetic field. The panel design may facilitate assembly, maintenance and repair without major disassembly of the tool.

Each panel may include a magnetic core, an axially sensing coil that is transversely wound about the magnetic core, and a laterally sensing coil that is longitudinally wound about the magnetic core. The coils may encircle the magnetic core without directly contacting the core. There may be, for example, one or more intervening layers located between the coil and the magnetic core. The axially sensing coil of each panel may be electrically connected to the axially sensing coils of the other panels to form an axial antenna responsive to a changing magnetic field. A magnetically transparent sleeve may enclose the antenna assembly—that is, the sleeve may cooperate with the carrier body to separate the antenna assembly from fluids in the borehole.

In one embodiment, the tool uses four identical quadrants as panels, each having a lateral winding and an axial winding. Opposing quadrant lateral windings may be connected to be sensitive to signals in one of the lateral axes, such that two pairs of opposing quadrant lateral winding yield two orthogonal lateral axis sensors. The three collocated antennas are orthogonal with respect to one another—that is, the tool responds to signals along three mutually orthogonal collocated axes. In one example, the axes are the tool axis (z), and two orthogonal lateral axes (x and y, respectively).

Figure 1B:
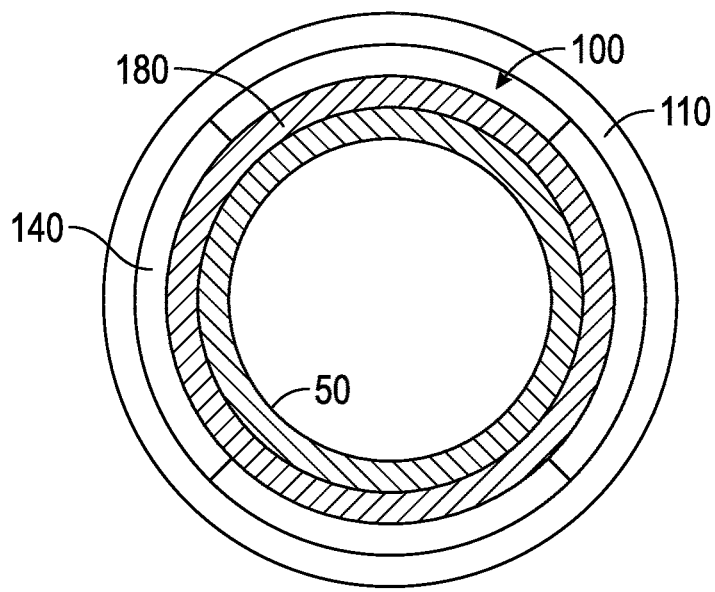

FIGS. 1A-1B show a TEM tool in accordance with embodiments of the present disclosure. The tool 10 is configured for use in a borehole 20 with its axis 25 substantially parallel to the longitudinal axis of the borehole (the z axis). Unless otherwise noted, the drawings herein are not to scale. The tool 10 includes a carrier 50 (e.g., a drill string, or wireline mandrel) conveyed in the borehole 20 and a tri-axial induction antenna assembly 100 along the carrier. Magnetically transparent sleeve 110 may enclose the antenna assembly 100.

FIG. 1B shows a cross-section of tool 10 showing antenna assembly 100. The antenna assembly comprises four panels 140. The panels may be substantially longitudinally aligned. In some embodiments, the panels are arranged in four quadrants (that is, quadrant panels) forming a cylinder, such as a circular cylinder. For convenience of discussion, the figures below related to cylindrical embodiments. However, it should be noted that substantially cylindrical embodiments are also within the scope of the disclosure.

The antenna assembly surrounds isolation underlayer 180, which isolates the antenna assembly 100 from the carrier 50. Isolation underlayer 180 may be formed from solid copper or other highly conductive material, ferrite or high magnetic permeability amorphous ribbon or nanocrystalline ribbon. Isolation underlayer 180 functions to minimize eddy currents in the carrier 50 (e.g., drill pipe), thus reducing undesirable voltage in the receivers induced by a magnetic field associated with these currents ("pipe signal"). The antenna assembly 100 may include panels 140 circumferentially arrayed about a portion of the carrier to form multiple collocated antennas.

Figure 2A:
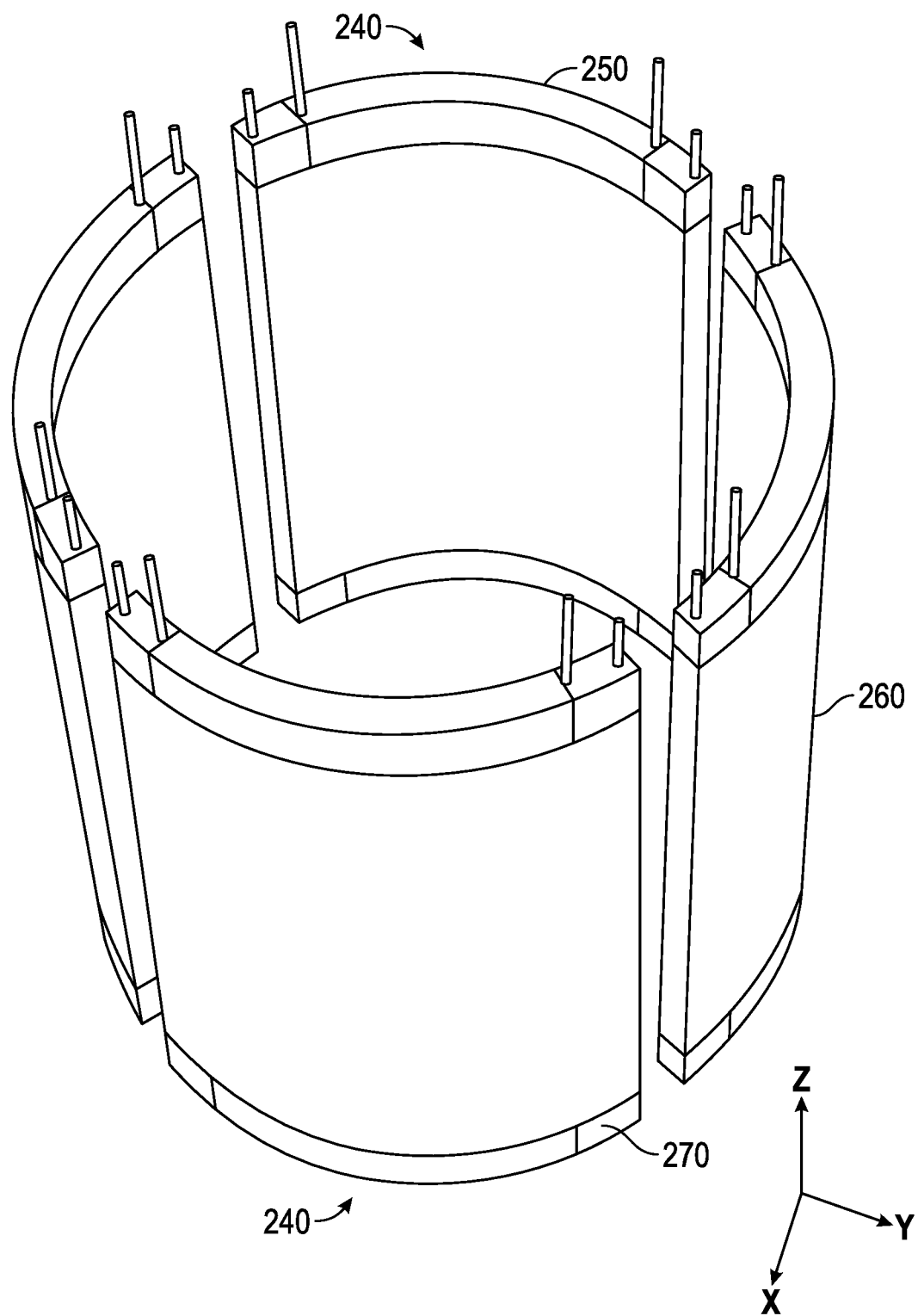
FIGS. 2A-2B show an antenna assembly in accordance with embodiments of the present disclosure.
Figure 2B:
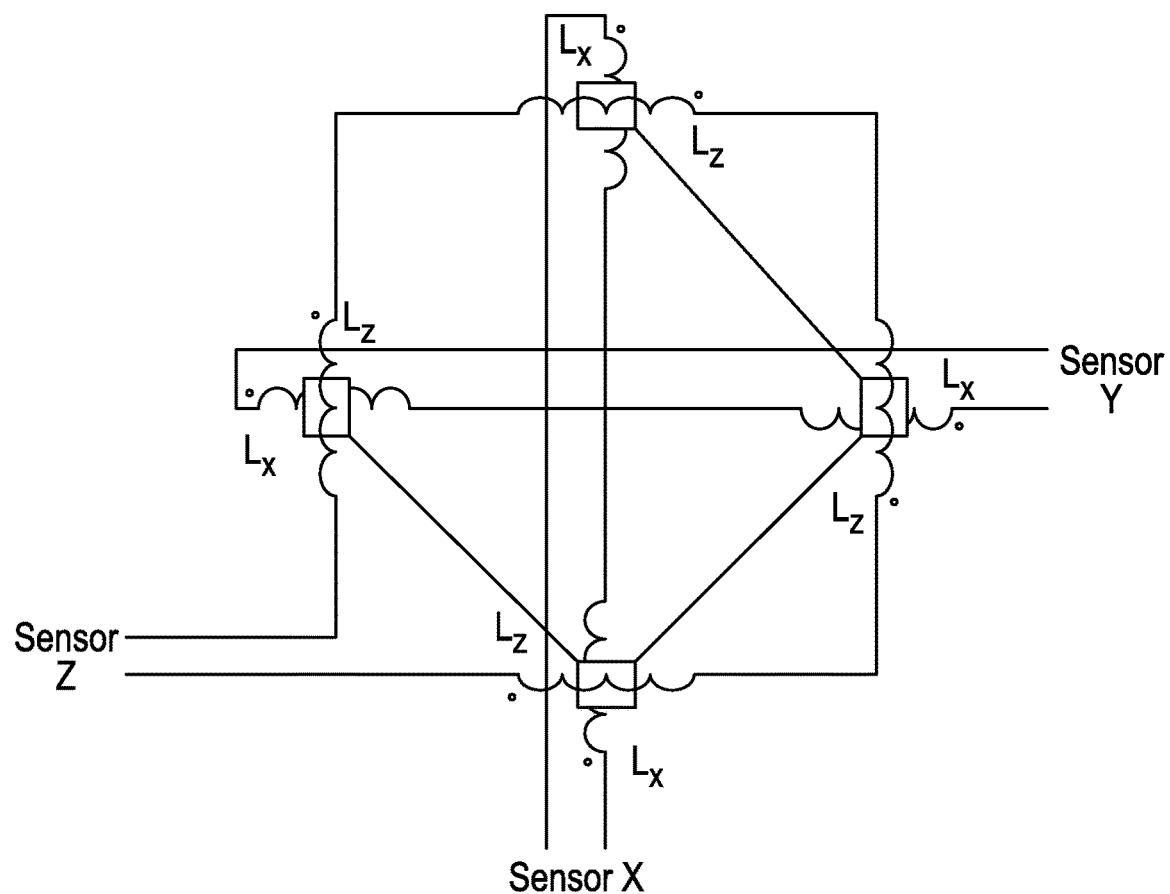

FIGS. 2A-2B show an antenna assembly 200 in accordance with embodiments of the present disclosure. Each panel 240 of antenna assembly 200 may include a magnetic core 270, an axially sensing coil 260 that is transversely wound about the magnetic core 270, and a laterally sensing coil 250 that is longitudinally wound about the magnetic core 270. FIG. 2B illustrates an electrical schematic of antenna assembly 200 in accordance with embodiments of the present disclosure. As shown in FIG. 2B, the axially sensing coils 260 and the laterally sensing coils 250 (collectively, "sensor coils") are wired to produce three separate antennas, with each antenna sensitive to a particular axis— that is, sensitive to magnetic components of EM signals aligned along a particular axis. The antenna assembly responds to a wideband pulse and provides for negligible delay in its transfer characteristic. For TEM applications, each induction antenna of the tri-axial antenna assembly may be configured to operate in a critically damped mode when rapidly changing signals (corresponding to wide band in frequency domain) are sensed. That is, the antenna is untuned, and provides maximum frequency/shortest time responses, while suppressing ringing and mitigating any parasitic capacitance associated with the coils. In particular embodiments, the broadband range may extend more than 200 kHz.

As implemented in FIGS. 2A-2B, the antennas are each sensitive to a corresponding one of three mutually orthogonal axes, shown here as the tool's axial (z) direction, and two mutually orthogonal lateral (x and y) directions. Basic processing and modeling of both transient and CW responses are based on coordinate axes that consists of one coaxial (z) axis and two mutually orthogonal lateral axes. Many antenna arrangements use one or two collocated tilted coils to sense signals along a vector that is at an angle from the z axis. Tool rotation and multiple measurements are used to sense signals that are a summed combination of signals in the x, y, and z axis. These summed signals must be processed using vector projections to extract the x, y and z axis signals. In the present three axis collocated sensor, alignment along the longitudinal axis of the tool enables measurements of signals along 3 separate axes, without rotating the tool and without using vector projection processing. So the axial sensing coil 260 of each panel 240 may be electrically connected to the axially sensing coils 260 of the other panels 240 so as to be sensitive to signals in the axial direction, thereby forming an axial antenna.

Other embodiments may include more than three antennas sensitive to more than three axes. Although orthogonal axis alignment has advantages that are appreciated in embodiments shown herein, this alignment is not a requirement, and other embodiments may include two or more antennas that are not orthogonally aligned. Orthogonal alignment may facilitate calculation of component signals.

Figure 3A:
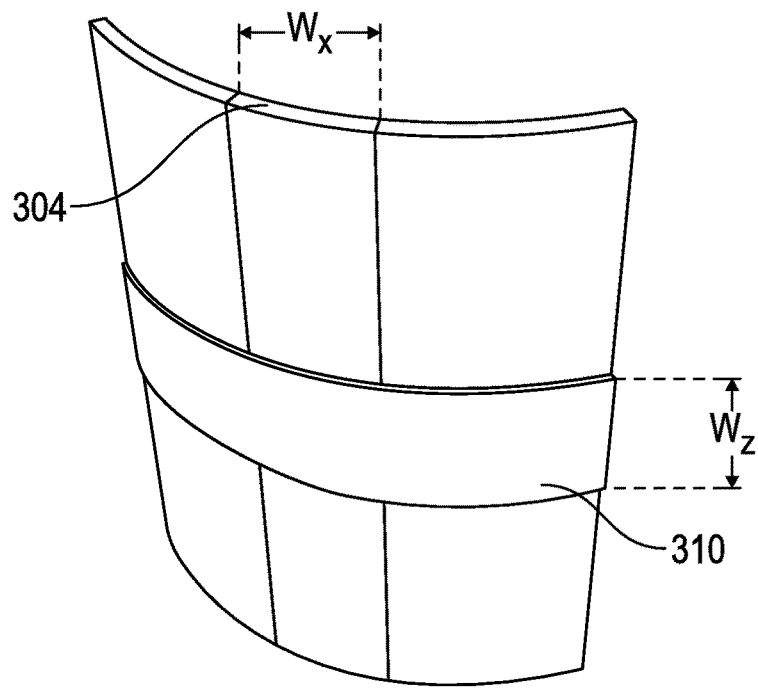
FIGS. 3A-3C illustrate a quadrant panel in accordance with embodiments of the present disclosure.
Figure 3B:
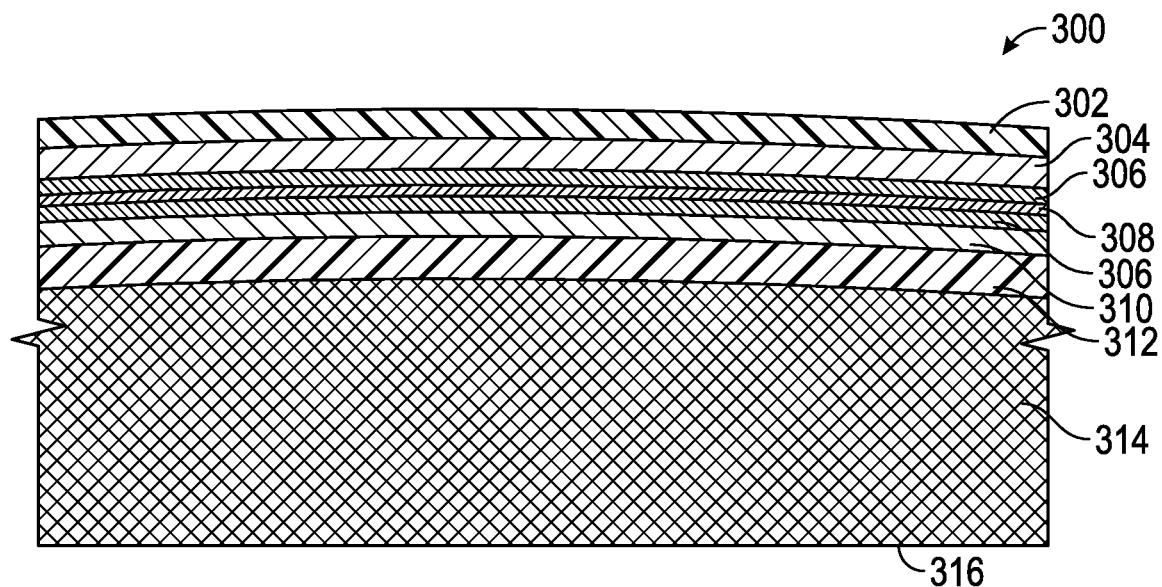
Figure 3C:
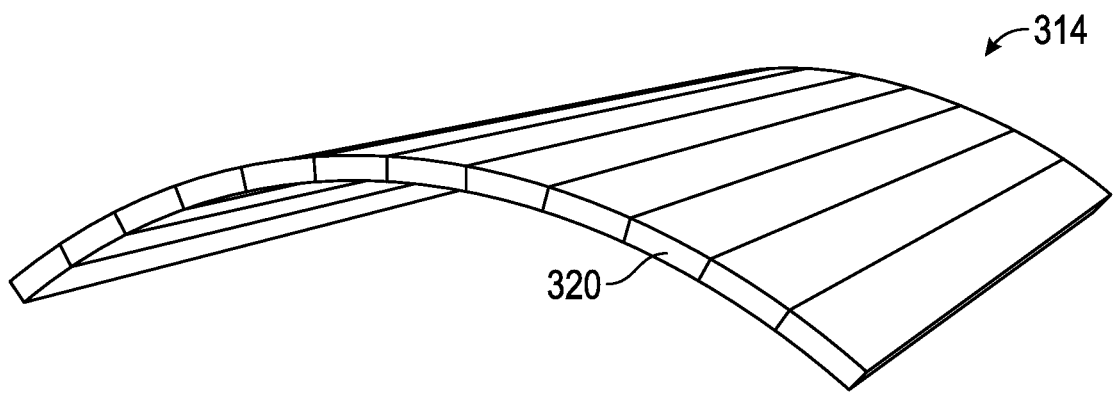

FIGS. 3A-3C illustrate a quadrant panel in accordance with embodiments of the present disclosure. FIG. 3A shows a representation of the axially sensing coil and the laterally sensing coil. Wire coils 304, 310 may have various numbers of turns, and may be centered on the planes of symmetry of the panel. The axially sensing coil 310 is wound centered on the plane that bisects the length of the panel. This coil may comprise one fourth of the final z antenna. The laterally sensing coil 304 is wound centered on the plane that bisects the width of the panel.

FIG. 3B illustrates a cross-section of the panel showing layered construction of the panel from the center line of the magnetic core 316 outward. The panel 300 comprises a core of magnetic material ('magnetic core') 314, such as, for example, ferrite, amorphous ribbon, or other material. Magnetic cores may increase sensor sensitivity and allow a lower number of turns in each coil, which results in the antenna having improved bandwidth, particularly with respect to antennas for a typical continuous wave (CW) resistivity tool. FIG. 3C illustrates a magnetic core according to embodiments of the present disclosure. The magnetic core 314 comprises a series of adjacent ferrite bars 320. The magnetic core may be encased in a hard epoxy coating 312, followed by wire wound around the panel to form the coils 304, 310. The epoxy coating 312 may be formed by various methods. In one example, the epoxy coating 312 is precision cast around the magnetic core in a mold.

Although the longitudinal winding (laterally sensing coil 304) is shown as being outermost in FIG. 3, in other implementations the axially sensing coil 310 that is transversely wound about the magnetic core may be the outermost coil on the panel. An electrostatic shield 308 may be located between the portions of the axial sensing coil and laterally sensing coil that will overlap. The electrostatic shield 308 suppresses signals from being capacitively coupled from the axial coil to the lateral coil. The electrostatic shield 308 may be made of a comb shaped pattern of copper etched on a flexible circuit board, and may be implemented as at least one of: i) a passive shield, ii) a passive unbalanced shield, iii) a passive balanced shield, and iv) an actively driven shield. A polytetrafluoroethylene ('PTFE') (or other dielectric material) layer 206 may surround the electrostatic shield 308 to reduce axial coil and lateral coil capacitance to the shield.

Overmold 302 comprises the outer layer of the panel. The overmold 302 may be made of an elastomeric material. Overmold 302 may be configured to maintain alignment of the magnetic core, the axially sensing coil, and the laterally sensing coil assembly within the downhole instrument during operation of the tri-axial antenna under pressure compensation while logging. Maintaining alignment enables precise and robust match of pairs of complete tri-axial sensors. Overmold 302 may be cast to give the quadrant a precise geometrical shape so that when four quadrants are mounted on the underlayer 180, the four quadrants together form a precise cylinder, with substantially no voids between them. This precise configuration of the antenna assembly also facilitates pressure compensation of the tool for operation at high temperatures and pressures. The tool may be capable of withstanding pressure to 25 kpsi, and temperatures to 150 degrees Celsius. Although exact specifications may be application and formation specific, an example quadrant panel may be quarter cylinder about 130 mm in length with an outer radius of 156 mm and thickness of 12 mm.

Figure 4:
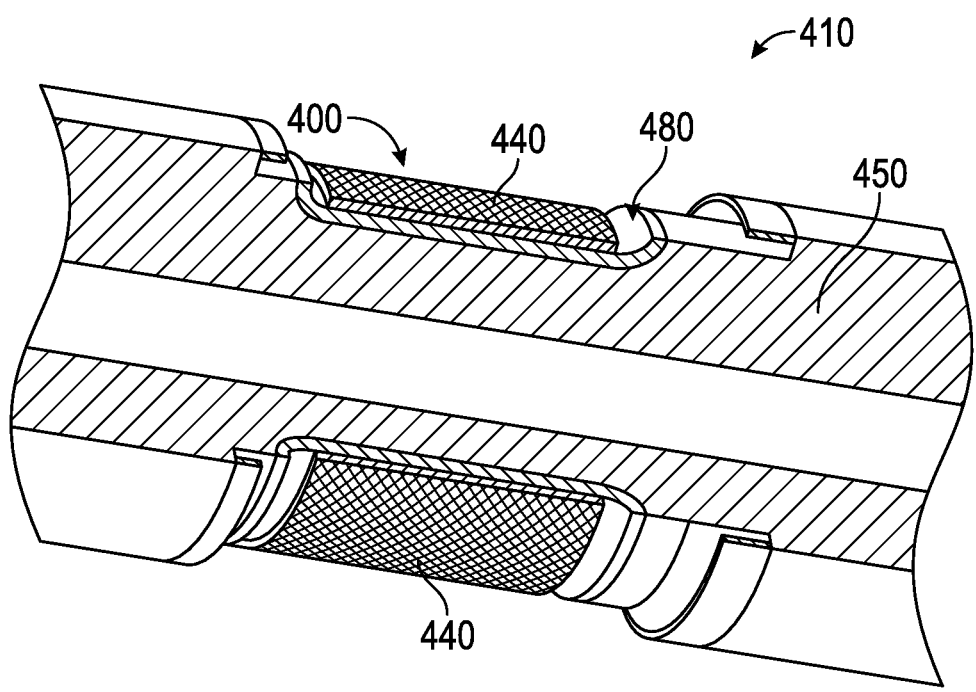
FIG. 4 shows a schematic cut-away view of a tool in accordance with embodiments of the present disclosure.

FIG. 4 shows a schematic cut-away view of a tool in accordance with embodiments of the present disclosure. Tool 410 comprises an antenna assembly 400 comprising quadrant panels 440 installed on a steel drill collar 450. A protective sleeve (not shown) encloses antenna assembly 400.

Mechanically rugged slotted metal sleeves having elongated slots have traditionally been used for outer protection of electromagnetic sensors ('EM sensors') in downhole applications, to prevent the environment of the borehole from damaging the sensors. In some ways, this type of sleeve may not be ideal for use with multi-axis co-located sensors. Slots in the metal sleeve are oriented parallel to the axis of sensitivity of the sensor. Further, when used for transient EM measurement ('TEM'), a slotted metal sleeve has disadvantages, including production of parasitic signals in the receiver. Suppression or cancellation of these signals is problematic. However, in some non-TEM applications, a metallic sleeve may have advantages recommending its use with the system described herein.

Returning to FIG. 1, the use of a magnetically transparent sleeve 110 mitigates the issues inherent in the slotted metal sleeves of the prior art. Magnetically transparent sleeve 110 may be made of thermoplastics (such as those in polyaryletherketone ('PAEK') family), other polymers, resins, or composite materials. In one implementation, polyetheretherketone ('PEEK') may be used. By "magnetically transparent" it is meant that the sleeve is substantially non-conductive, such that electrically it will not produce parasitic signals in the receiver sufficient to prevent useful employment of the instrument in detecting TEM signals or that it is made of non-conductive or substantially non-conductive materials.

"Substantially non-conductive material," as used herein, is defined as a material having a volume resistivity greater than $10^{-2}$ ohm-meters and may include composite materials, powdered metals, and so on. "Non-conductive materials," as used herein, is defined as materials having a volume resistivity greater than $10^3$ ohm-meters. One specific type of composite materials includes carbon-reinforced composite materials. The resistivity (and strength) of carbon reinforced composite materials are typically linked to the amount of carbon fiber (or carbon tape) used in the composite. Alternative carbon fiber materials may employ designs where carbon filaments can be laid down in such a way that they are insulated from each other, resulting in tool bodies that are at least substantially non-conducting at frequencies of operation for the antenna assembly.

In operation, panels in accordance with embodiments disclosed herein may be configured to have one coil sensitive to magnetic fields to the axial (z) direction and one coil sensitive to fields in the lateral (x or y) direction. The coils may be configured for precise alignment of these coils' sensitive axes orthogonally to each other. To wit, precision of alignment may be preserved through installation of the panels on the carrier. For example, in a quadrant panel embodiment, as installed, all four axial windings in the four quadrants may line up precisely with the carrier axis (z axis) (e.g. longitudinal axis of the drillpipe); two opposing quadrants' lateral coils may align with a lateral axis (designated as x); and the other two opposing quadrants' lateral coils may align with a lateral axis orthogonal to the x axis (designated as y). The coils from the quadrants may be wired to produce a three port sensor, with one port corresponding to a sensor in the axial (z) direction, while the other two terminals correspond to the sensors in the lateral x and y directions.

In some implementations, the disclosed embodiments may be used as part of a drilling system. An example drilling system for use in conjunction with measurement-while-drilling ('MWD') is illustrated herein.

Figure 5:
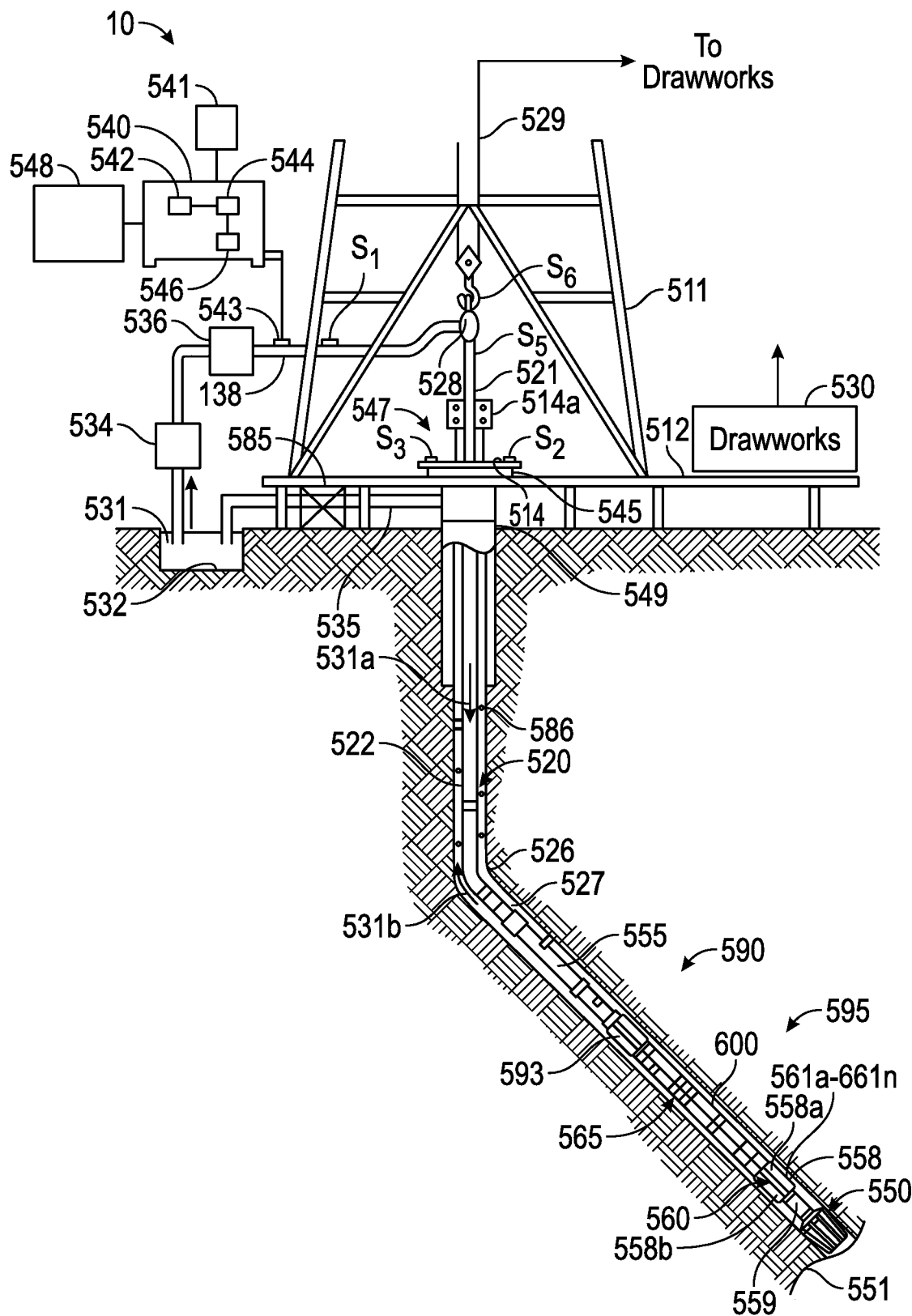
FIG. 5 is a schematic diagram of an exemplary drilling system according to one embodiment of the disclosure.

FIG. 5 is a schematic diagram of an exemplary drilling system 10 according to one embodiment of the disclosure. FIG. 5 shows a drill string 520 that includes a bottomhole assembly (BHA) 590 conveyed in a borehole 526. The drilling system 10 includes a conventional derrick 511 erected on a platform or floor 512 which supports a rotary table 514 that is rotated by a prime mover, such as an electric motor (not shown), at a desired rotational speed. A tubing (such as jointed drill pipe 522), having the drilling assembly 590, attached at its bottom end extends from the surface to the bottom 551 of the borehole 526. A drill bit 550, attached to drilling assembly 590, disintegrates the geological formations when it is rotated to drill the borehole 526. The drill string 520 is coupled to a drawworks 530 via a Kelly joint 521, swivel 528 and line 529 through a pulley. Drawworks 530 is operated to control the weight on bit ("WOB"). The drill string 520 may be rotated by a top drive (not shown) instead of by the prime mover and the rotary table 514. Alternatively, coiled-tubing may be used as the tubing 522. A tubing injector 514a may be used to convey the coiled-tubing having the drilling assembly attached to its bottom end. The operations of the drawworks 530 and the tubing injector 514a are known in the art and are thus not described in detail herein.

A suitable drilling fluid 531 (also referred to as the "mud") from a source 532 thereof, such as a mud pit, is circulated under pressure through the drill string 520 by a mud pump 534. The drilling fluid 531 passes from the mud pump 534 into the drill string 520 via a desurger 536 and the fluid line 538. The drilling fluid 531a from the drilling tubular discharges at the borehole bottom 551 through openings in the drill bit 550. The returning drilling fluid 531b circulates uphole through the annular space 527 between the drill string 520 and the borehole 526 and returns to the mud pit 532 via a return line 535 and drill cutting screen 585 that removes the drill cuttings 586 from the returning drilling fluid 531b. A sensor S1 in line 538 provides information about the fluid flow rate. A surface torque sensor S2 and a sensor S3 associated with the drill string 520 respectively provide information about the torque and the rotational speed of the drill string 520. Tubing injection speed is determined from the sensor S5, while the sensor S6 provides the hook load of the drill string 520.

Well control system 547 is placed at the top end of the borehole 526. The well control system 547 includes a surface blow-out-preventer (BOP) stack 515 and a surface choke 549 in communication with a wellbore annulus 527. The surface choke 549 can control the flow of fluid out of the borehole 526 to provide a back pressure as needed to control the well.

In some applications, the drill bit 550 is rotated by only rotating the drill pipe 522. However, in many other applications, a downhole motor 555 (mud motor) disposed in the BHA 590 also rotates the drill bit 550. The rate of penetration (ROP) for a given BHA largely depends on the WOB or the thrust force on the drill bit 550 and its rotational speed.

A surface control unit or controller 540 receives signals from the downhole sensors and devices via a sensor 543 placed in the fluid line 538 and signals from sensors S1-S6 and other sensors used in the system 10 and processes such signals according to programmed instructions provided to the surface control unit 540. The surface control unit 540 displays desired drilling parameters and other information on a display/monitor 541 that is utilized by an operator to control the drilling operations. The surface control unit 540 may be a computer-based unit that may include a processor 542 (such as a microprocessor), a storage device 544, such as a solid-state memory, tape or hard disc, and one or more computer programs 546 in the storage device 544 that are accessible to the processor 542 for executing instructions contained in such programs. The surface control unit 540 may further communicate with a remote control unit 548. The surface control unit 540 may process data relating to the drilling operations, data from the sensors and devices on the surface, and data received from downhole; and may control one or more operations of the downhole and surface devices. The data may be transmitted in analog or digital form.

The BHA 590 may include a tool 500 configured for performing transient electromagnetic (TEM) measurements. The BHA 590 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 595 surrounding the BHA 590. For convenience, all such sensors are generally denoted herein by numeral 565. The BHA 590 may further include a variety of other sensors and devices 559 for determining one or more properties of the BHA 590, such as vibration, bending moment, acceleration, oscillations, whirl, stick-slip, weight-on-bit, fluid flow rate, pressure, temperature, rate of penetration, azimuth, tool face, drill bit rotation, etc.

The BHA 590 may include a steering apparatus or tool 558 for steering the drill bit 550 along a desired drilling path. In one aspect, the steering apparatus may include a steering unit 560, having a number of force application members 561a-561n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 558 having a bent sub and a first steering device 558a to orient the bent sub in the wellbore and the second steering device 558b to maintain the bent sub along a selected drilling direction. The steering unit 558, 560 may include near-bit inclinometers and magnetometers.

The drilling system 10 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 520 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 10 can include one or more downhole processors at a suitable location such as 593 on the BHA 590. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 542 can process the surface measured data, along with the data transmitted from the downhole processor, to evaluate the formation. While a drill string 520 is shown as a conveyance device for tool 500, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 10 may include a bottomhole assembly and/or sensors and equipment for implementation of embodiments of the present disclosure on either a drill string or a wireline.

A point of novelty of the system illustrated in FIG. 5 is that the surface processor 542 and/or the downhole processor 593 are configured to perform certain methods (discussed below) that are not in the prior art. Surface processor 542 or downhole processor 593 may be configured to control steering apparatus 558, mud pump 534, drawworks 530, rotary table 514, downhole motor 555, other components of the BHA 590, or other components of the drilling system 10. Surface processor 542 or downhole processor 593 may be configured to control sensors described above and to estimate a parameter of interest according to methods described herein.

Control of these components may be carried out using one or more models using methods described below. For example, surface processor 542 or downhole processor 593 may be configured to modify drilling operations i) autonomously upon triggering conditions, ii) in response to operator commands, or iii) combinations of these. Such modifications may include changing drilling parameters, steering the drillbit (e.g., geosteering), and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 542, downhole processor 593, or other processors (e.g. remote processors) may be configured to operate the TEM tool 500 to induce and measure TEM signals.

Figure 6:
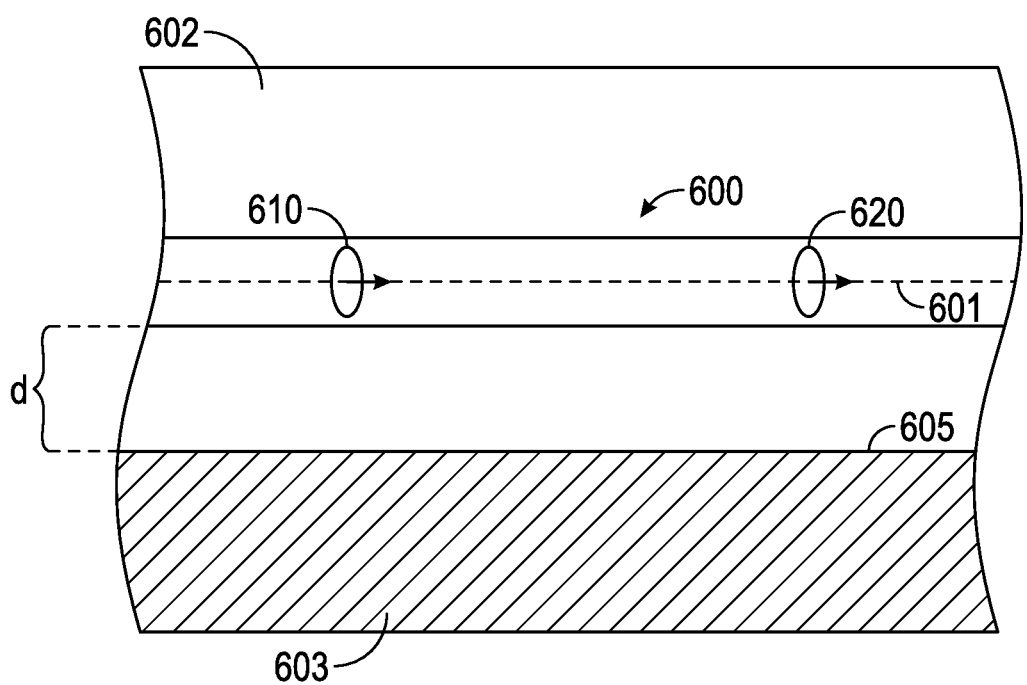
FIG. 6 illustrates a TEM tool in a subterranean environment in accordance with embodiments of the present disclosure.

FIG. 6 illustrates a TEM tool 600 in a subterranean environment in accordance with embodiments of the present disclosure. The tool 600 may include a transmitter 610 and a receiver 620 disposed along a drillstring, as described above with reference to FIG. 5, or on a wireline tool. Transmitters and/or receivers may include a collocated tri-axial antenna as described herein. Other embodiments may include additional transmitters or receivers, which may also be a collocated tri-axial antenna. The transmitter 610 may be configured to induce transient currents in the formation. For example, the transmitter 610 may include an antenna coupled with a current source. The receiver 620 may be configured to convert a time-dependent transient electromagnetic signal induced from the formation into an output signal. The tool 600 may be configured to cause the transient electromagnetic signal by abruptly changing a magnetic moment of the transmitter 610. This may be carried out by switching a current on and off in a transmitter antenna coil to generate abrupt changes in magnetic moment of the coil. Alternately, switching fast high-energy current pulses in a coil surrounding a soft magnetic core can be used to reverse the polarity of the magnetic core thereby abruptly reversing the direction of the magnetic dipole moment of the antenna. Some embodiments may include a collocated tri-axial antenna for both transmitting and receiving signals and/or one or more bucking components. Many variations in transmitter and receiver configurations may be successfully employed. Transmitters and receivers may vary in number, location (e.g., with respect to the tool, to one another, to the drill bit, and so on) and orientation (e.g., transverse, longitudinal, tilted, etc.).

In operation, tool 600 is configured to effect changes in the transmitter to induce a transient current in the formation. Transient signals occur in the receiver antennas that are induced by the formation responsive to the current. The induced signal contains information about formation characteristics. Thus, the receiver produces a response indicative of formation characteristics, such as formation resistivity or distance to bed boundaries. A processor is configured to measure the time-dependent transient electromagnetic (TEM) signal induced by the formation.

TEM tool 600 lies next to a formation interface 605. Transmitter 610 and receiver 620 lie along a common axis 601 that is horizontally positioned in the upper half-space 602 parallel to the interface and is separated by a distance d from the interface. The term "interface" includes a fluid interface between two different fluids in an earth formation (e.g., a fluid front) as well as a boundary between two different geologic or stratigraphic intervals in the earth (e.g., distance to bed). Examples herein may use distance to bed for convenience of illustration, but it should be readily apparent that embodiments wherein distance to an interface of a different type is estimated are within the scope of the disclosure.

The presence of conductive water in a formation that includes nonconductive hydrocarbons produces a resistivity contrast that can be located using embodiments of the present disclosure. For example, the antenna assembly of the present disclosure may be used in TEM or CW systems installed on tubing for the purpose of reservoir monitoring, i.e., measuring migration of oil water interface, or advancement of waterfront for water drive Enhanced Oil Recovery.

One way of characterizing an earth formation is by using gravity measurements to estimate hydrocarbon or other fluid movement. Time-lapse reservoir monitoring may be one application for embodiments of the present disclosure. Hydrocarbons in earth formations, such as reservoirs, are subject to the migration of fluids (oil, water, gas, etc.) over time. Detecting, measuring, and mapping the movement of these fluids may be useful for estimating the producible hydrocarbon content of an earth formation and improving hydrocarbon recovery. The hydrocarbon movement may also be used to estimate the rate of depletion of a reservoir.

Embodiments of the present disclosure may be applied in monitoring fluid fronts. One situation where a fluid front may arise is in secondary and enhanced recovery operations where a fluid such as water is injected into the formation from an injection well spaced apart from the well. Methods may further include conducting secondary and enhanced recovery operations in dependence upon information relating to the fluid front.

In some embodiments, a wireline tool may be deployed in a well, called a monitor well. Using the tool allows the location of the fluid front to be identified, which facilitates control of secondary recovery operations. In other embodiments the tool may be permanently deployed in a borehole. The permanent deployment may be in a production well.

Aspects of the present disclosure include methods for estimating a value of a parameter of interest, such as, for example, resistivity values, distance to bed, multiple bed resistivities, and multiple bed thicknesses. General method embodiments may include estimating a parameter of interest using TEM signals.

Figure 7:
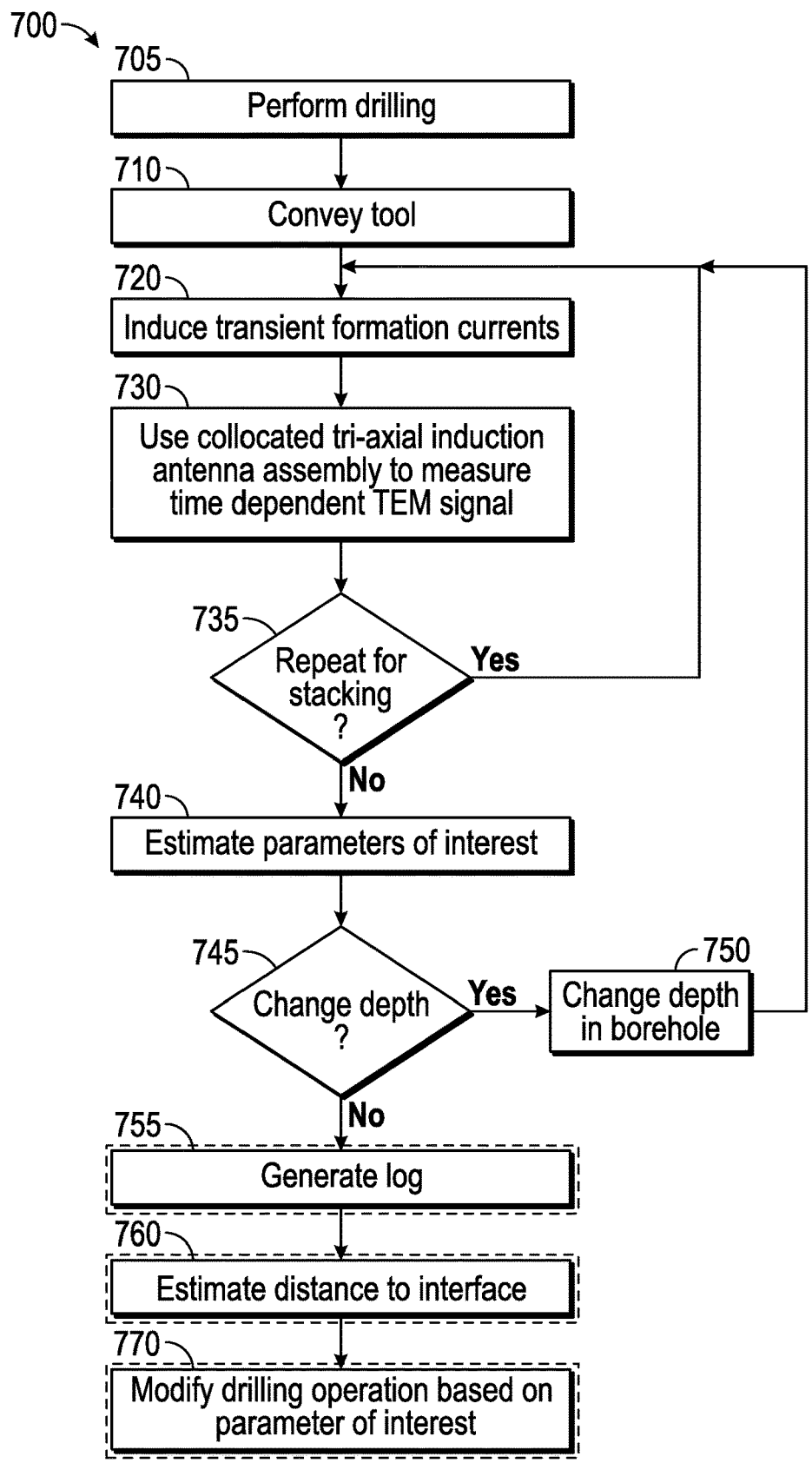
FIG. 7 illustrates a method for estimating a parameter of interest in accordance with embodiments of the present disclosure.

FIG. 7 illustrates a method for estimating a parameter of interest in accordance with embodiments of the present disclosure. Optional step 705 of the method 700 may include performing a drilling operation in a borehole. For example, a drill string may be used to form (e.g., drill) the borehole. Optional step 710 may include conveying a TEM tool 600 in the borehole on a conveyance device.

Step 720 of the method 700 includes inducing a transient current in the formation. This may be carried out by abruptly changing a magnetic moment of a transmitter in the borehole. Step 730 of the method 700 includes using a collocated tri-axial induction antenna assembly as disclosed herein to measure a time-dependent transient electromagnetic (TEM) signal induced by the formation responsive to the current, which produces TEM measurement information. The information is indicative of the signal generated in the receiver and caused by the formation responsive to the current.

Step 740 of the method 700 includes estimating formation parameters of interest (e.g., resistivity values and distance to nearest bed boundary) using the TEM measurement information. Optionally, at step 740, the method may be carried out by identifying, from a plurality of simulated homogeneous formations, the simulated homogeneous formation having synthetic responses that provide the best fit for the measurement information. In particular embodiments, steps 720 and 730 may be repeated several times to obtain the measurements (735), which are then stacked before estimating the formation parameters of interest in step 740.

Optional step 750 may include repeating steps 720-740 to estimate corresponding resistivity values for a plurality of borehole depths. Optional step 755 may include generating a log of the corresponding resistivity values as a function of borehole depth. Optional step 760 may include using the corresponding resistivity values to estimate a corresponding distance to an interface. Optional step 770 may include modifying drilling operations in the borehole dependent upon the estimated resistivity values, the distance to interface, or other parameters of interest.

For convenience we include the following definitions of terms used herein. The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors, and tubing using in reservoir monitoring.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

"Pressure compensation", as used herein refers to measures taken to prevent damage to the tool from the effects of the high pressures of the downhole environment, including, for example, ensuring structural integrity, designing structural reinforcement, interior pressurization, and so on. The term "predominantly" relates to an amount of current induced in a depth of investigation in the earth formation relative to an amount of current induced in another depth in the earth formation. A predominantly greater amount of current induced in the depth of interest will provide a response of electromagnetic energy that can be related to a property of the earth formation at the depth of investigation. As used herein, the term "predominantly" relates at least to a minimum amount of increase in currents induced at the depth of investigation with respect to other depths, the minimum amount being necessary to be able to estimate a property of the earth formation at the depth of investigation from the response.

Although various embodiments are depicted above depicting a cylindrical antenna assembly having four panels, embodiments featuring more than four panels are consistent with the present disclosure. In varying embodiments, panels may be planar or curved in one or more dimensions, and may be identical or non-identical with respect to each other.

"Collocated" refers to overlap of an antenna footprint on the tool in the direction of the longitudinal tool axis ('longitudinal footprint') with another antenna. "Substantially longitudinally aligned," as defined herein, means that each panel shares at least half of its longitudinal footprint with another panel. "Substantially cylindrical," in addition to its customary meaning also includes tubular forms having a cross-section substantially similar to a regular convex polygon, such as, for example, a square, a pentagon, a hexagon, an octagon, a hectogon, and so on, or an approximation of such polygons using curved sides. "Substantially a quadrant" refers to a panel approximating a fourth of an antenna assembly that is substantially cylindrical.

The term "passive" as used herein means electrically connected to an appropriate grounding point on the carrier. The term "passive unbalanced" as used herein means electrically connected to an appropriate coil terminal. The term "passive balanced" as used herein means electrically connected to one or both of the ground of the differential coil electronics or central tap of the antenna's coil. The term "actively driven" as used herein means configured to suppress common voltage signal induced at the coil terminals using capacitive coupling with other coils in the antenna.

Boreholes are typically drilled into the earth formations in order to intersect and access the formations. During or after drilling, evaluation of the formation may be carried out using embodiments of the present disclosure. "Formation" as used herein refers to a subterranean volume of earth surrounding the borehole, both laterally and vertically, and may include multiple beds. "Evaluation of the formation" or "estimating a value of a resistivity property of an earth formation", or like phrases, as defined herein, may refer to estimation or evaluation of a volume of interest within the formation up to including the entirety of the formation. For example, evaluating the formation may include evaluation of volumes ahead of the bit at a depth below the borehole.

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. An apparatus for estimating a value of a resistivity property of an earth formation intersected by a borehole, the apparatus comprising:
   a carrier conveyable in the borehole;
   a tri-axial induction antenna assembly along the carrier, the tri-axial induction antenna assembly comprising panels circumferentially arrayed about a portion of the carrier to form at least three collocated antennas, with each panel including:
      a magnetic core,
      an axially sensing coil that is transversely wound about the magnetic core; and
      a laterally sensing coil that is longitudinally wound about the magnetic core; and
   a sleeve enclosing the antenna assembly;
   wherein the magnetic core of each panel is positioned such that the magnetic cores of the panels collectively are circumferentially arrayed about the portion of the carrier.

2. The apparatus of claim 1 wherein three of the at least three collocated antennas are orthogonal with respect to one another.

3. The apparatus of claim 1 wherein the at least three collocated antennas include an axial antenna aligned with a longitudinal axis of the carrier.

4. The apparatus of claim 1 wherein the axially sensing coil of each panel is electrically connected to the axially sensing coils of the other panels to form an axial antenna.

5. The apparatus of claim 1 wherein the panels are arranged in four quadrants including at least one of i) a first quadrant disposed on an opposite side of the carrier from a third quadrant, and ii) a second quadrant disposed on another opposite side of the carrier from a fourth quadrant.

6. The apparatus of claim 5 wherein the corresponding lateral coils are electrically connected for at least one of
 i) each of the first quadrant and the third quadrant, and
 ii) each of the second quadrant and the fourth quadrant,
wherein the connected corresponding lateral coils form a lateral antenna.

7. The apparatus of claim 5, wherein the quadrants substantially form a cylinder.

8. The apparatus of claim 1 wherein each induction antenna of the tri-axial antenna assembly is configured to operate in a critically damped mode when conducting at least one of: i) receiving a signal with frequencies over a broadband range, and ii) transmitting a signal with frequencies over a broadband range.

9. The apparatus of claim 8 wherein the broadband range includes frequencies greater than 200 kHz.

10. The apparatus of claim 1 comprising a conductive underlayer surrounding the portion of the carrier and separating the portion and the tri-axial antenna assembly.

11. The apparatus of claim 1, wherein the panels are substantially longitudinally aligned.

12. The apparatus of claim 1 wherein each panel is individually removable from the carrier.

13. The apparatus of claim 1 wherein at least one of the panels comprises an electrostatic shield layer separating the corresponding axial coil and the corresponding lateral coil.

14. The apparatus of claim 13 wherein the electrostatic shield comprises at least one of: i) a passive shield, ii) a passive unbalanced shield, iii) a passive balanced shield, and iv) an actively driven shield.

15. The apparatus of claim 1 wherein each panel comprises an overmold surrounding the magnetic core, the axially sensing coil and the laterally sensing coil, the overmold configured to maintain alignment of the magnetic core, the axially sensing coil and the laterally sensing coil assembly with respect to the downhole instrument during operation of the tri-axial antenna under pressure compensation while logging.

16. The apparatus of claim 1 comprising a processor configured to estimate the value of the resistivity property of the earth formation using signals from the tri-axial antenna assembly.

17. The apparatus of claim 16 wherein the processor is configured to estimate the value of the resistivity property using transient electromagnetic (TEM) signals received by the tri-axial antenna assembly.

18. A method for evaluating an earth formation intersected by a borehole, the method comprising:
 (a) inducing a current in the formation;
 (b) measuring a time-dependent transient electromagnetic (TEM) signal induced by the formation responsive to the current using a tri-axial induction antenna assembly on a carrier in the borehole, the tri-axial induction antenna assembly comprising panels circumferentially arrayed about a portion of the carrier to form at least three collocated antennas, with each panel including a magnetic core, an axially sensing coil that is transversely wound about the magnetic core, and a laterally sensing coil that is longitudinally wound about the magnetic core, wherein the magnetic core of each panel is positioned such that the magnetic cores of the panels collectively are circumferentially arrayed about the portion of the carrier; and
 (c) estimating a parameter of interest using the signal.

* * * * *